(12) United States Patent
Krispin

(10) Patent No.: US 10,399,627 B2
(45) Date of Patent: Sep. 3, 2019

(54) WEARABLE SIGNALING SYSTEM AND METHODS

(71) Applicant: Yeshaya Krispin, Lakewood, NJ (US)

(72) Inventor: Yeshaya Krispin, Lakewood, NJ (US)

(73) Assignee: ROADWAREZ INC., Lakewood, NJ (US)

( * ) Notice: Subject to any disclaimer, the term of this patent is extended or adjusted under 35 U.S.C. 154(b) by 372 days.

(21) Appl. No.: 15/113,831

(22) PCT Filed: Jan. 26, 2015

(86) PCT No.: PCT/IB2015/050567
§ 371 (c)(1),
(2) Date: Jul. 24, 2016

(87) PCT Pub. No.: WO2015/111010
PCT Pub. Date: Jul. 30, 2015

(65) Prior Publication Data
US 2016/0347391 A1    Dec. 1, 2016

Related U.S. Application Data

(60) Provisional application No. 61/965,255, filed on Jan. 27, 2014, provisional application No. 62/075,914, filed on Nov. 6, 2014.

(51) Int. Cl.
*B62J 3/00*     (2006.01)
*B62J 6/00*     (2006.01)
*A41D 1/00*     (2018.01)
*A41D 1/04*     (2006.01)

(52) U.S. Cl.
CPC .............. *B62J 6/005* (2013.01); *A41D 1/002* (2013.01); *A41D 1/04* (2013.01); *B62J 6/00* (2013.01); *A41D 2600/102* (2013.01); *A41D 2600/104* (2013.01); *B62J 2006/006* (2013.01); *B62J 2006/008* (2013.01)

(58) Field of Classification Search
CPC ........ B62J 6/005; B62J 6/00; B62J 2006/006; B62J 2006/008; A41D 1/002; A41D 1/04; A41D 2600/104; A41D 2600/102
USPC .......................................................... 340/432
See application file for complete search history.

(56) References Cited

U.S. PATENT DOCUMENTS

| | | | |
|---|---|---|---|
| 9,096,174 B1* | 8/2015 | Banks | B60Q 1/34 |
| 9,116,667 B1* | 8/2015 | St. Louis | G06F 1/163 |
| 2002/0044052 A1* | 4/2002 | Stewart | A41D 13/01 340/475 |
| 2002/0145864 A1* | 10/2002 | Spearing | B60Q 1/2673 362/103 |
| 2003/0213045 A1* | 11/2003 | Fuentes | A41D 13/01 2/69 |

(Continued)

FOREIGN PATENT DOCUMENTS

WO    2012151642 A1    11/2012

*Primary Examiner* — Kerri L McNally
*Assistant Examiner* — Thang D Tran
(74) *Attorney, Agent, or Firm* — AlphaPatent Associates, Ltd; Daniel J. Swirsky

(57) ABSTRACT

A signaling system is provided, comprising a vest having a rear-facing display and a controller. The vest is configured to communicate with the controller for operating the display. The controller is configured to operate the display based at least on data from a GPS module and one or more motion sensors.

8 Claims, 3 Drawing Sheets

(56) References Cited

U.S. PATENT DOCUMENTS

| | | | |
|---|---|---|---|
| 2005/0275193 A1* | 12/2005 | Lee | B60Q 1/2673 280/468 |
| 2006/0291193 A1* | 12/2006 | Hill | A41D 13/01 362/108 |
| 2008/0089056 A1* | 4/2008 | Grosjean | B60Q 1/2673 362/103 |
| 2008/0218369 A1* | 9/2008 | Krans | A47G 9/1045 340/691.1 |
| 2010/0124049 A1* | 5/2010 | Fabian | A41D 13/01 362/108 |
| 2010/0253501 A1* | 10/2010 | Gibson | A41D 13/01 340/475 |
| 2011/0292667 A1* | 12/2011 | Meyers | B60Q 1/38 362/465 |
| 2012/0053889 A1* | 3/2012 | Sambongi | G03F 7/70775 702/150 |
| 2012/0163269 A1* | 6/2012 | Shuster | H04W 4/206 370/312 |
| 2012/0184367 A1* | 7/2012 | Parrott | G06F 1/163 463/31 |
| 2012/0190384 A1 | 7/2012 | Marr et al. | |
| 2012/0310465 A1* | 12/2012 | Boatright | B60Q 1/346 701/25 |
| 2014/0232570 A1* | 8/2014 | Skinder | G01C 21/165 340/989 |
| 2014/0280580 A1* | 9/2014 | Langlois | H04W 4/005 709/204 |
| 2015/0185045 A1* | 7/2015 | Crawford | G01C 22/006 702/97 |

\* cited by examiner

WEARABLE SIGNALING SYSTEM AND METHODS

CROSS-REFERENCE TO RELATED APPLICATIONS

This application is a U.S. National Phase Application under 35 U.S.C. 371 of International Application No. PCT/IB2015/050567, which has an international filing date of Jan. 26, 2015, and which claims priority and benefit from U.S. Provisional Patent Application No. 61/965,255, filed Jan. 27, 2014 and U.S. Provisional Patent Application No. 62/075,914, filed Nov. 6, 2014, the contents and disclosures of which are incorporated herein by reference in their entirety.

FIELD OF THE INVENTION

The present disclosure relates to signaling systems for users of open vehicles. In particular, it relates to such systems designed to be worn during use.

SUMMARY OF THE INVENTION

According to one aspect of the presently disclosed subject matter, there is provided a signaling system, comprising a vest having a rear-facing display and a controller, the vest being configured to communicate with the controller for operating the display, wherein the controller is configured to operate the display based at least on data from a GPS module and one or more motion sensors.

The vest may comprise the GPS module. The vest may further comprise a memory module loaded with map data configured to be correlated with data from the GPS module.

The vest may be configured to retrieve map data from an external source, based on data from the GPS module.

The vest may be configured to communicate with an external GPS module. The external GPS module may be integrated with a smartphone.

The motion sensors may comprise one or more selected from the group including an accelerometer and a tilt sensor.

The controller may be configured to determine, based on the data from the GPS module and one or more motion sensors, one or more of the following:
  that a vehicle is turning and that the display should indicate a turn signal;
  that the vehicle is turning and that the display should not indicate a turn signal; and
  that the vehicle is not turning and that the display should indicate a turn signal.

According to another aspect of the presently disclosed subject matter, there is provided a method of displaying a turn signal, the method comprising:
  providing a signaling system having a vest with a rear-facing display a controller, and one or more motion sensors;
  acquiring, by the controller, GPS data from a GPS module;
  determining, based on the GPS data and outputs of the motion sensors, that a turn signal should be displayed; and
  operating the display to indicate an appropriate turn signal.

The vest may comprise the GPS module.
The vest may comprise a memory module loaded with map data configured to be correlated with data from the GPS module.

The method may further comprise retrieving map data from an external source, based on data from the GPS module.

The GPS module may be external to the signaling system. The external GPS module may be integrated with a smartphone.

The motion sensors may comprise one or more selected from the group including an accelerometer and a tilt sensor.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION OF EMBODIMENTS

Figure 1:
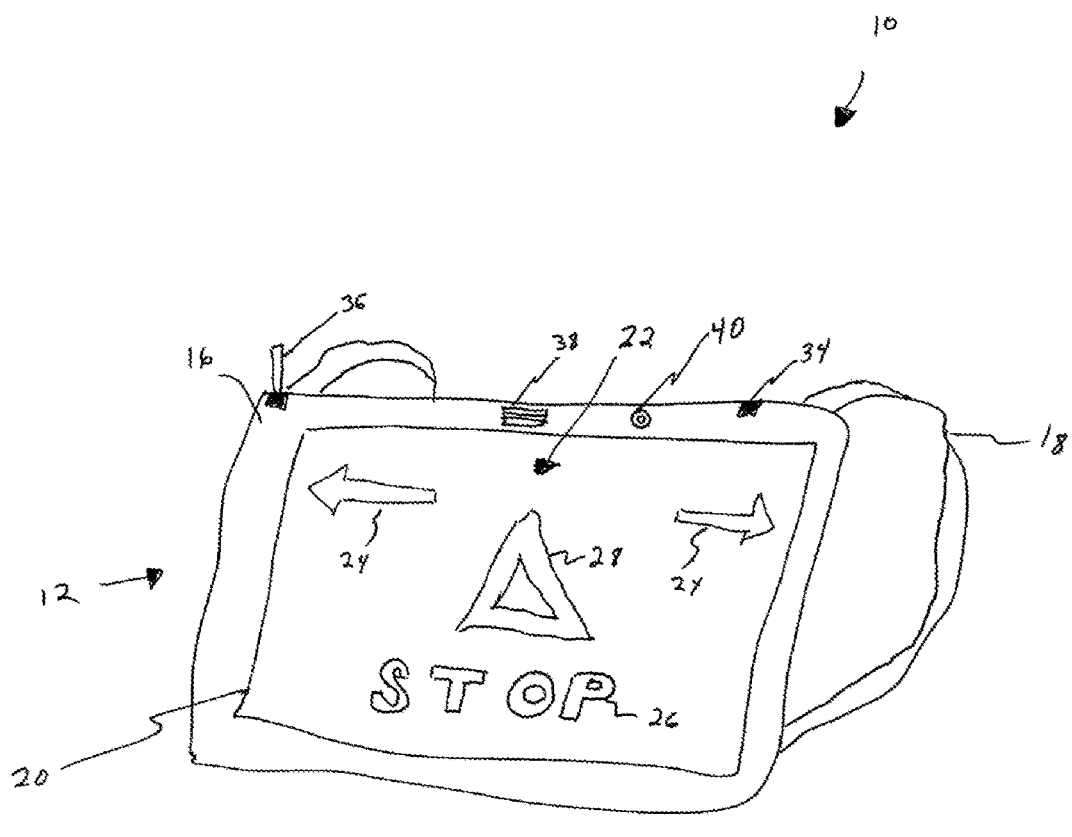
FIG. 1 illustrates a signaling system according to the presently disclosed subject matter.

As illustrated in FIG. 1, there is provided a signaling system, which is generally indicated at 10, designed for use by a rider of an open vehicle. Herein the specification and claims, the term "open vehicle" is used to denote a motorcycle, moped, motor scooter, manual or powered bicycle, or any other mode of transportation wherein a rider's upper body is exposed and readily visible to other travelers on the road. The system 10 comprises a wearable vest 12, a control interface 14, and a controller.

The vest 12 is configured to be worn by a user, and thus comprises a rear panel 16 and a carrying arrangement 18. The carrying arrangement 18 is configured to cooperate with the rear panel 16 to facilitate wearing the vest 12 such that when worn by a user, the rear panel 16 lays across the user's back, and is visible to an observer therebehind.

The carrying arrangement 18 may comprise a pair of straps, as illustrated. Alternatively, it may comprise any suitable arrangement to facilitate wearing the vest 12 as described above. According to one example, the carrying arrangement 18 may comprise a pair of front panels attached to bottom edges of the rear panel 16, giving rise to a pair of armholes. According to another example, the carrying arrangement 18 may comprise a single front panel attached to the rear panel 16 at two ends of a top edge thereof, giving rise to a neckhole, and being open at the sides.

The rear panel 16 comprises a rear-facing display 20 (i.e., disposed so as to be visible from an observer behind the user when wearing the vest 12), comprising one or more indicators, which are generally indicated at 22, thereon. The indicators 22 may be illuminative, for example comprising one or more light emitting diodes (LEDs). The controller is configured to operate the indicators 22 to produce signals signifying information about the user, in particular relating to parameters of the drive. According to some modifications, the display comprises a flexible screen, for example comprising organic light-emitting diodes (OLEDs), or any other suitable technology.

For example, one or more of the indicators 22 may be configured to signify that the user is about to or is in the middle of executing a right or left turn (i.e., constituting turn signals 24); one or more of the indicators 22 may be configured to signify that the user is in the middle of slowing down (i.e., constituting a brake light 26); one or more of the indicators 22 may be configured to signify a hazard such as a the vehicle being stopped in or near moving traffic, that the vehicle is disabled, that a vehicle is moving substantially slower than the flow of traffic, etc. (i.e., constituting a hazard warning light 28, which may be constantly illuminated or be flashing). It will be appreciated that the indicators 22 may be configured to display any other suitable message, mutatis mutandis.

Figure 2:
FIG. 2 illustrates a grid of indicators of the signaling system illustrated in FIG. 1.

According to some examples, as illustrated in FIG. 2, the indicators 22 are arranged as a grid constituting pixels, with the controller being configured to selectively activate only those indicators required to produce the required signal. According to other examples, for example as illustrated in FIG. 1, the indicators 22 comprise preformed signals, for example comprising LED strips, with the control being configured to selectively activate a required indicator to illuminate the required signal.

The control interface 14 is configured to facilitate the user to communicate with the vest 12, e.g., via the controller. It comprises a housing 30, which may contain the controller therein, and one or more user input devices 32. The user input devices 32 are configured to allow the user to indicate to the controller the type of signal to be displayed by the indicators 22 on the rear panel 16 of the vest. It may comprise, e.g., one or more switches, buttons, dials, etc., each of which (or positions of which) correspond to a different signal to be displayed by the indicators (e.g., turn signals, hazard warning lights, etc.).

According to some modifications, some or all of the user input devices 32 may be integrated into the vehicle, e.g., to be automatically activated during use of the vehicle. For example, for vehicles with integrated turn signals, user input devices 32 may be mounted to the vehicle such that when the user operates the vehicle turn signal, the user input device 32 is automatically operated. This may be accomplished mechanically (e.g., by positioning the user input device of the signaling system 10 such that movement of an element which operates the turn signal also operates the user input device), electrically (e.g., by wiring the user input device of the signaling system 10 to monitor an electrical signal which operates the turn signal of the vehicle, and to operate the indicators 22 accordingly), visually (i.e., by mounting cameras to monitor to turn signals of the vehicle, and operate the indicators 22 accordingly), or according to any other suitable method.

It will be appreciated that while the above example related to the turn signal of the vehicle, the user input device 32 may be similarly integrated to be automatically activated during use of the vehicle, mutatis mutandis. For example, a user input device may be situated so as to be activated by application of a brake pedal or grip, etc.

The control interface 14 is configured to communicate with the vest 12, e.g., the display 20 thereof, via any suitable method. According to some examples, they communicate wirelessly with each other, for example using one or more of a local area network, radio, Bluetooth, ZigBee, Near Field Communication, or any other suitable technology for facilitating wireless communication. A transmitter (not illustrated) may be integrated with the controller, and a receiver 34 provided on the vest 12 in communication with the display.

According to some modifications, the signaling system 10 does not comprises a dedicated control interface 14 and/or controller. Rather, the vest 12 (and elements thereof) is configured to communicate directly with a third-party device, such as a telephone (e.g., a mobile phone with advanced computing capabilities, herein "smartphone") or any other suitable electronic device (such as a pocket-sized computer, for example as marketed under the trade name "iPod®" by Apple Inc.). The device may be configured (e.g., by installing an application thereon) to receive user input (e.g., by visually sensing hand motions, by presenting a simulated control interface, etc.) and communicate a command to the vest 12 to operate the indicators 22 accordingly.

According to some examples, the device may be an optical head-mounted display, such as that marketed under the name "Glass™" by Google Inc.

According to the above, the device constitutes both the control interface 14 and controller of the signaling system 10.

The vest 12 may comprise a global positioning system (GPS) module 36, configured to determine the current location of the vest (and thus the user) in real time by communicating with the GPS satellite network. According to some examples, the module may be provided with local street maps, for example via map data being loaded into a memory module thereof. According to other examples, the vest 12 may communicate location information determined by the GPS to a device (such as a smartphone, pocket-sized computer, etc.) which provides relevant map data thereto, e.g., based on the determined location. The signaling system 10 may provide this information to a remote party, e.g., to track the user. This may be useful for facilitating a business to track a fleet of delivery vehicles, for enabling a parent or guardian to locate a child, etc. An alarm 38, which may produce one or more of an audio and a visual signal, may be activated if a user goes beyond a predefined area.

It will be appreciated that while the vest 12 is described above as comprising a GPS module 36, the GPS module may be part of a separate unit configured to communicate therewith, including, but not limited to, a smartphone, a head-mounted display, a dedicated GPS module, the controller, etc., without departing from the scope of the presently disclosed subject matter.

GPS data may be used to compare the speed of the vehicle to the speed of surrounding traffic, for example based on internet-based real time traffic information. If the controller determines, based on the GPS data and traffic information received, that the vehicle is moving at a speed which is significantly lower than that of surrounding traffic (e.g., a predetermined percentage or net speed amount lower), it may automatically activate the indicators 22 to display a hazard warning light 28. Similarly, GPS data may be used to automatically detect if the vehicle is slowing down, wherein the controller may activate the indicators 22 to display a brake light 26.

The signaling system 10 may comprise one or more motion sensors (e.g., an accelerometer, tilt sensor, etc., not illustrated) configured to determine parameters of the motion of the vehicle. These parameters may include, but are not limited to, turning, braking, driving speed, etc. The signaling system 10 may thus be configured to automatically activate the indicators 22 to display a suitable signal.

For example, if the motion sensors determine that the vehicle is turning, it may automatically activate the indicators 22 to display a turn signal 24. This function may be integrated with GPS data. Based on the determined location of the vehicle and corresponding map data, the signaling system 10 may be configured to determine whether a detected vehicle turn is a turn which should be indicated (for example turning onto a side street) or is a turn which should not be indicated (for example following the topography of a curved road). The signaling system 10 may thus be configured to activate appropriate indicators 22 based on both determinations made by the motion sensors and GPS data. For example, the indicators may display a turn signal 24 when a vehicle turn is detected by the motion sensors, and the GPS data suggests that a turn should be indicated. The controller may employ one or more heuristic algorithms to make the determination.

By using data from both motion sensors and GPS sensors, the signaling system 10 may be configured to automatically display a signal faster and/or more accurately than it would be able to based only on one thereof. In addition is to the example provided above with respect to a turn signal, the determination of vehicle speed (i.e., to automatically activate the indicators 22 to display a brake light 26 and/or hazard warning light 28, as described above) may be supplemented with data from the motion sensors.

The controller maybe configured, based on one or more of GPS data and data from the motion sensors, to determine if an emergency (such as a collision) has occurred. It may further be configured to send out one or more appropriate distress signals, such as communicating with emergency services, sending a message to one or more predetermined contacts (such as a parent, etc.). The signaling system 10 may be configured to interface with a mobile telephone for this purpose.

The vest 12 may further comprise one or more cameras 40 on the rear panel 16, disposed so as to image the area behind the user when wearing the vest. Image data may be recorded and/or communicated to a display unit mounted on the vehicle in front of the user. The display unit may be a dedicated device, or a suitably-configured (e.g., by installation of an application thereon) smartphone and/or pocket-sized computer. The signaling system 10 may thus be used to provide a rear-view to a user when operating his vehicle. This data may be selectively communicated to one or more predetermined contacts of the user.

The signaling system may be configured to automatically archive, either locally or on a remote server accessed wirelessly, visual data recorded by the cameras 40. This may be done automatically, or be event-driven (i.e., in case of an accident).

In addition, the camera 40 may be configured to be used to enable the system 10 to detect and alert vehicles behind the user if they are approaching too closely or too quickly.

According to one example, image data captured by the camera 40 may be used by the controller to determine relative speed of a vehicle approaching from behind the user. This may be accomplished, e.g., by analyzing the image data to detect objects, determining an object to be an approaching vehicle, and tracking the relative size of the object compared to the size of the same object captured in previous frames. Thus, the system 10 may determine if a vehicle approaching from behind is accelerating or maintaining its speed when it should be slowing down, etc.

According to another example, image data captured by the camera 40 may be used by the controller to determine the distance of a vehicle behind the user. This may be accomplished, e.g., by analyzing the image data and comparing it to objects of known sizes. For example, the controller may be preloaded with information related to the size of one or more features of vehicles, such as the size of license plates, the distance between outer edges of headlights (which may be, e.g., typical distances for most cars, distances for particular models of cars which may be determined based on recognizing the front of the car, etc.), or any other suitable value. The controller may thus be configured to determine the distance by comparing the apparent size of the feature captured by the camera to the known size thereof.

The system 10 may be further configured to be used as a social media device. For example, it may be configured to share images captured by the camera 40 on one or more social media networks. It will be appreciated that the "sharing on a social media network" as used herein the specification and claims includes, but is not limited to, posting on an online social media platform such that it can be accessed by anyone with access to the platform or by a predefined set of users, forwarding to a predefined set of contacts, for example via electronic mail, SMS or MMS message, or any other similar medium. Additionally or alternatively, the system may be configured to share the location of the system 10 on a social media network.

The location may be shared alone (e.g., as GPS data, such as GPS coordinates), or in conjunction with other information. The information may include, but is not limited to, a shared image, location information (e.g., a landmark, business, or other location in the vicinity of the shared location; it will be appreciated that the location may be shared with the location information, or the location information may be shared as the location), or any other suitable information.

The system 10 may be further configured to be used to report emergency information. For example, it may be configured to facilitate a user's inputting a report of an emergency and transmitting the emergency to the relevant emergency service (e.g., an emergency telephone number such as 911, 112, or 999, fire, police, or first aid services, an online emergency reporting service, etc.). It may further or alternatively be configured to automatically detect an emergency situation, for example by sensing disturbances to the vest (e.g., via the motion sensors), using image recognition of images captured via the camera 140, etc. The emergency information may include, but is not limited to, one or more of location, type of emergency, and images.

According to any one of the above examples, the controller may be configured, if it determines that a vehicle approaching from behind is too close or approaching too quickly, to activate one or more of the indicators 22 to display an appropriate warning to the vehicle.

The display may be further configured to display advertisement information. The information may be predetermined. According to some modifications, the controller may use GPS data to select and/or determine advertising information for display. For example, the signaling system 10 may be configured to display information relating to a business (e.g., a theater, restaurant, etc.) when the user is within a predetermined radius thereto. The signaling system may be further configured to display emergency information provided, e.g., by government agencies.

Figure 3:
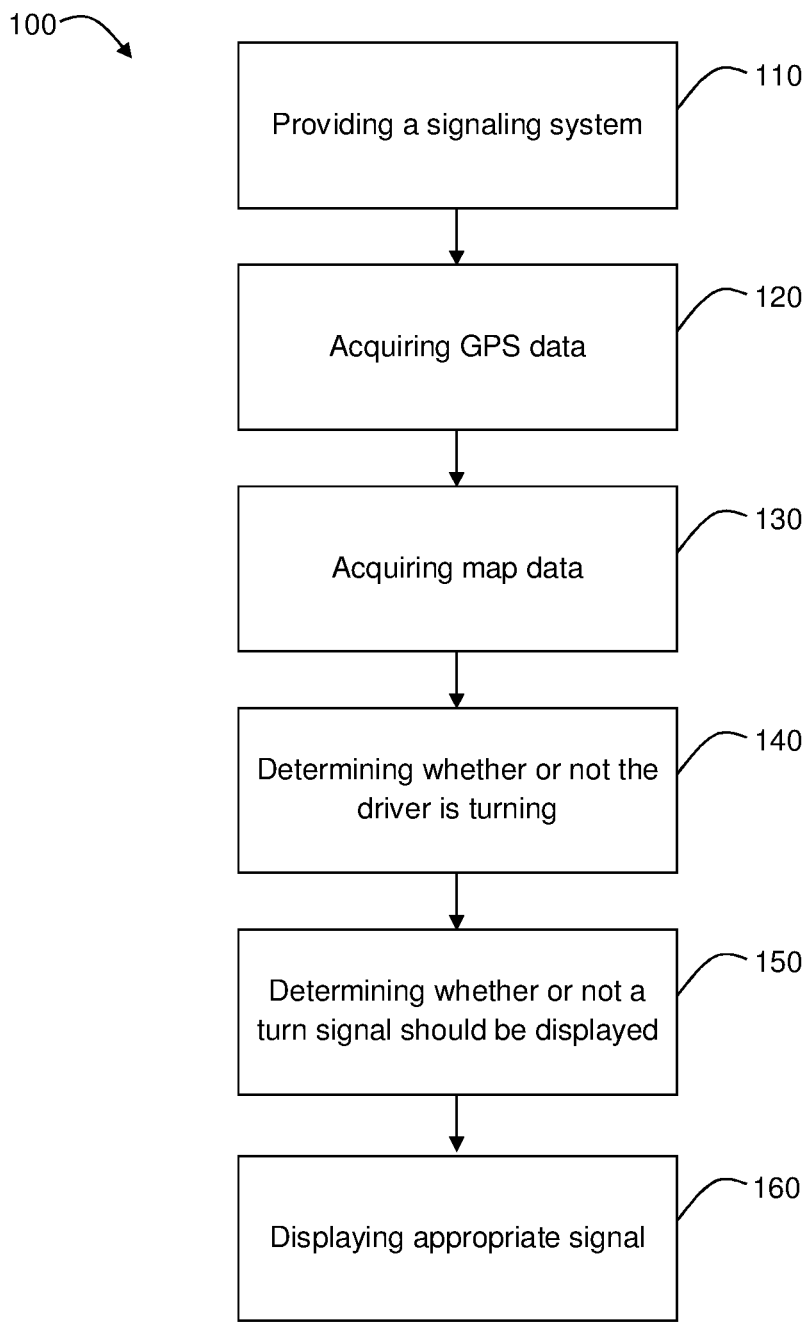
FIG. 3 illustrates a method of indicating a turn signal.

The system 10 as described above may be used to facilitate execution of one or more methods. For example, as illustrated in FIG. 3, a method 100 may be provided, whereby the system 10 indicates a turn signal on its display 20.

In step 110 of the method 100, a signaling system 10 is provided, such as described above with reference to FIGS. 1 and 2. In particular, the system 10 may be configured to acquire GPS and location data, and may comprise a display 20 with indicators 22, a controller, and one or more motion sensors, such as one or more accelerometers, one or more tilt sensors, etc.

In step 120, the system 10 acquires data, relating to the current location thereof, from a GPS module. According to some examples, the GPS module is integrated with the system 10. According to other examples, the GPS module is external to the system 10 (such as a smartphone or a standalone GPS module), and the system is configured to communicate with it, inter alia to receive GPS data.

In step 130, the system 10 acquires map data corresponding to the GPS data acquired in step 120. According to some examples, the system 10 is preloaded with the map data. According to other examples, the system is configured to acquire the map data from an external source (such as a smartphone or by connecting directly to an information server, e.g., via the internet), e.g., on demand based on the GPS data.

In step 140, the system 10 determines, based on information provided by the motion sensors thereof, whether or not the vehicle being driven by the user is turning.

As In step 150, the controller determines, based on the location information provided by the GPS, the map data, and the information provided by the motion sensors, whether or not a turn signal should be displayed. For example, if the motion sensors indicate a turn, but the GPS and map data indicate that the user is following the topography of the road, the controller may determine that no turn signal should be displayed. If the motion sensors indicate no turn, but the GPS and map data indicate that the user is entering an exit ramp, the controller may determine that a turn signal should be displayed.

In step 160, if the controller in step 150 determined that a turn signal should be displayed, indicators 22 of the system 10 are activated to display the appropriate signal.

Figure 4:
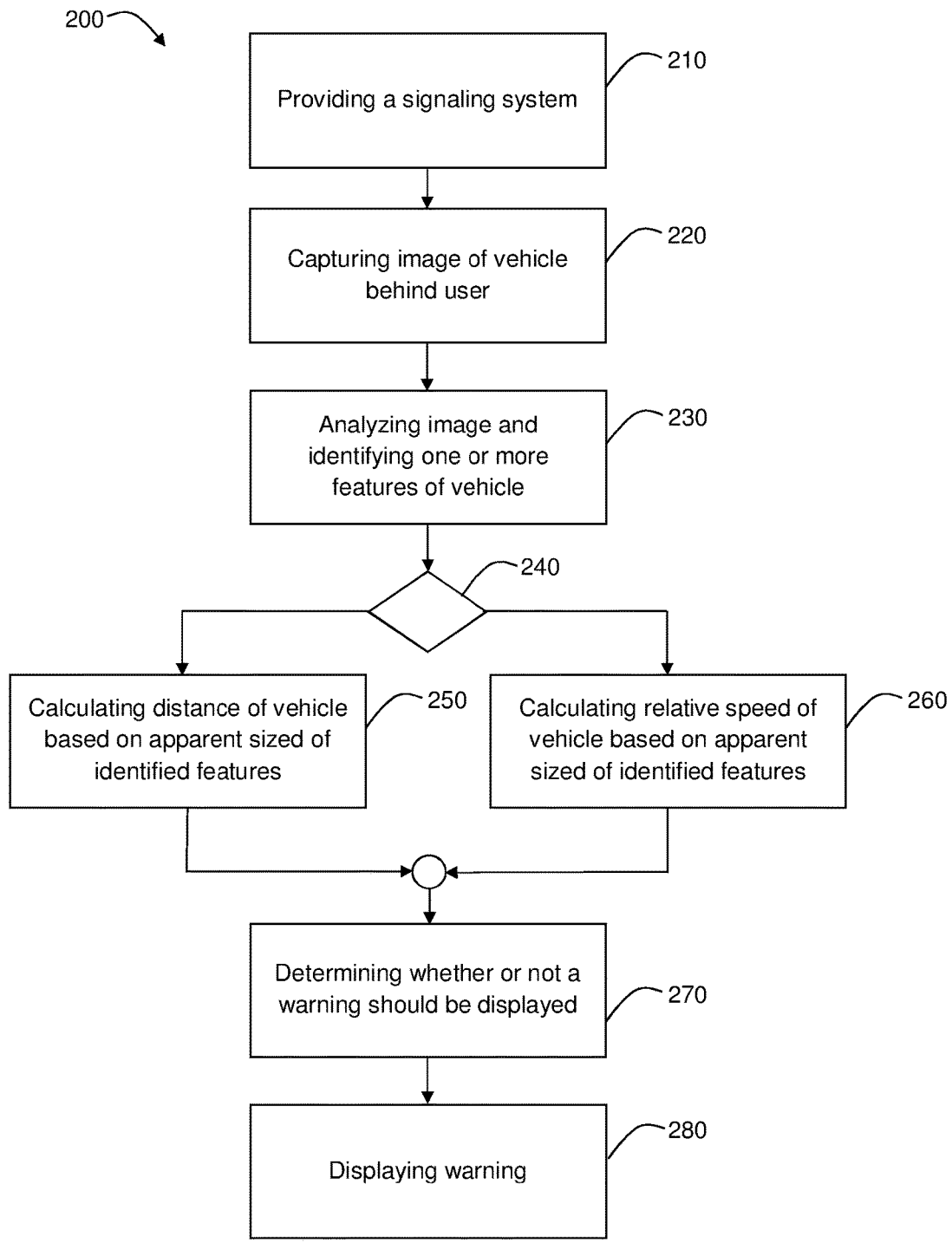
FIG. 4 illustrates a method of indicating a warning.

As illustrated in FIG. 4, another method 200 may be provided, whereby the system 10 indicates a warning to vehicles therebehind on its display 20.

In step 210 of the method 200, a system 10 is provided, such as described above with reference to FIGS. 1 and 2. In particular, the system 10 may be provided with a controller, a display 20 with indicators 22, and a camera 40.

In step 220, the camera 40 captures an image of a vehicle behind the user.

In step 230, the controller analyzes the image captured by the camera, and identifies one or more features of the vehicle therebehind.

In decision step 240, the controller chooses to determine whether to assess the distance (in step 250 below) or speed (in step 260 below) of a vehicle approaching therebehind.

In step 250, the controller compares the identified features, and calculates its distance based on the apparent size thereof based on the captured image, and preloaded information relating to its actual size. For example, the controller may be preloaded with information relating to the actual size of a license plate. Information relating to the apparent size of the portion of the captured image corresponding to the license plate (such as the number of vertical and/or horizontal pixels thereof, and camera information) is used to calculate the distance the license plate would be to produce such an image.

In step 260, the controller compares the relative size of one or more of the same identified features in different frames captured by the camera 40. By comparing the change in size of these features, and taking into account the elapsed time between the captured frames, the controller calculates if the vehicle approaching from behind is accelerating, or maintaining its speed (e.g., when it should be slowing down), etc.

It will be appreciated that the method 200 may be provided without one of steps 250 and 260 (and without the decision step 240), and/or with steps 250 and 260 be performed in parallel, without departing from the scope of the presently disclosed subject matter, mutatis mutandis.

In step 270, the controller determines, based on the calculations performed in either or both of steps 250 and 260, whether a warning to vehicles therebehind should be displayed.

In step 280, if the controller in step 270 determined that a warning should be displayed, indicators 22 of the system 10 are activated to display the appropriate signal.

Those skilled in the art to which this invention pertains will readily appreciate that numerous changes, variations and modifications can be made without departing from the scope of the invention mutatis mutandis.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

As used herein, the singular form "a", "an" and "the" may include plural references unless the context clearly dictates otherwise. For example, the term "a compound" or "at least one compound" may include a plurality of compounds, including mixtures thereof.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. A method of displaying a turn signal, the method comprising:
   providing a signaling system having a vest with a rear-facing display a controller, and one or more motion sensors;
   acquiring, by said controller, GPS data from a GPS module;
   determining, based on said GPS data and outputs of said motion sensors, that a turn signal should be displayed; and
   operating said display to indicate an appropriate turn signal.

2. The method according to claim 1, wherein said vest comprises said GPS module.

3. The method according to claim 2, wherein said vest comprises a memory module loaded with map data configured to be correlated with data from said GPS module.

4. The method according to claim 2, further comprising retrieving map data from an external source, based on data from said GPS module.

5. The method according to claim 1, wherein said GPS module is external to said signaling system.

6. The method according to claim 5, wherein said external GPS module is integrated with a smartphone.

7. The method according to claim 1, further comprising obtaining motion sensing data from an external source.

8. The method according to claim 1, wherein said motion sensors comprise one or more selected from the group including an accelerometer and a tilt sensor.

* * * * *